(12) United States Patent
Sun et al.

(10) Patent No.: US 12,496,761 B2
(45) Date of Patent: Dec. 16, 2025

(54) SEALING APPARATUS, SEALING AND CUTTING DEVICE, AND PROCESSING METHOD

(71) Applicant: SUZHOU YIBEN LIFE TECHNOLOGY CO., LTD, Suzhou (CN)

(72) Inventors: Guoxiang Sun, Suzhou (CN); Yonghua Dong, Suzhou (CN)

(73) Assignee: SUZHOU YIBEN LIFE TECHNOLOGY CO., LTD, Suzhou (CN)

( * ) Notice: Subject to any disclaimer, the term of this patent is extended or adjusted under 35 U.S.C. 154(b) by 148 days.

(21) Appl. No.: 18/424,734

(22) Filed: Jan. 26, 2024

(65) Prior Publication Data

US 2024/0246276 A1     Jul. 25, 2024

Related U.S. Application Data

(63) Continuation of application No. PCT/CN2022/108754, filed on Jul. 28, 2022.

(51) Int. Cl.
| | |
|---|---|
| *B29C 48/25* | (2019.01) |
| *B26D 3/16* | (2006.01) |
| *B29C 48/00* | (2019.01) |

(52) U.S. Cl.
CPC .............. *B29C 48/254* (2019.02); *B26D 3/16* (2013.01); *B29C 48/0022* (2019.02)

(58) Field of Classification Search
CPC ...... B29C 48/254; B29C 48/0022; B26D 3/16
See application file for complete search history.

(56) References Cited

U.S. PATENT DOCUMENTS

| | | | | |
|---|---|---|---|---|
| 3,160,690 | A * | 12/1964 | Schaich | B29C 49/04112 425/308 |
| 4,832,773 | A * | 5/1989 | Shaposka | B29C 65/7441 604/905 |
| 5,348,063 | A * | 9/1994 | Handleman | B65B 1/28 141/10 |
| 5,775,852 | A * | 7/1998 | Boutte | B65B 69/0091 406/120 |
| 6,246,028 | B1 * | 6/2001 | Lage | B29C 48/91 219/404 |
| 9,388,657 | B2 * | 7/2016 | Nelson | E21B 33/06 |
| 11,435,337 | B2 * | 9/2022 | Rehman | G01N 30/02 |
| 2008/0018055 | A1 * | 1/2008 | Moldt | B29C 48/254 277/500 |

(Continued)

*Primary Examiner* — Sean M Michalski
(74) *Attorney, Agent, or Firm* — George Guosheng Wang; Upstream Research and Patent LLC

(57) ABSTRACT

A sealing apparatus (10, 10'), comprising a sealing base plate (1, 1'), pressing parts (2, 2'), and a sealing turntable (3, 3'), wherein a plurality of pressing parts are enclosed at one end to form a shrink hole (101, 101'), and the sealing turntable drives the plurality of pressing parts to move synchronously so as to continuously shrink or expand the shrink hole. A sealing and cutting device, comprising the sealing apparatus (10, 10'), a cutting apparatus (20, 20') and a conveying apparatus (70, 70'), wherein the conveying apparatus is arranged at a first end of the sealing apparatus so as to convey a material (60) along a set direction, and the cutting apparatus is arranged at a second end of the sealing apparatus for use in cutting the material.

7 Claims, 13 Drawing Sheets

(56) References Cited

U.S. PATENT DOCUMENTS

| | | | | |
|---|---|---|---|---|
| 2011/0167763 A1* | 7/2011 | Waldherr | .............. | B29C 65/787 |
| | | | | 53/370.7 |
| 2020/0002167 A1* | 1/2020 | Naito | ..................... | A23B 2/721 |
| 2020/0355668 A1* | 11/2020 | Rehman | ................ | G01N 33/287 |
| 2021/0291412 A1* | 9/2021 | Perez Llanos | .......... | B29C 48/14 |
| 2021/0308642 A1* | 10/2021 | Rönnback | ........... | B01F 35/2218 |

\* cited by examiner

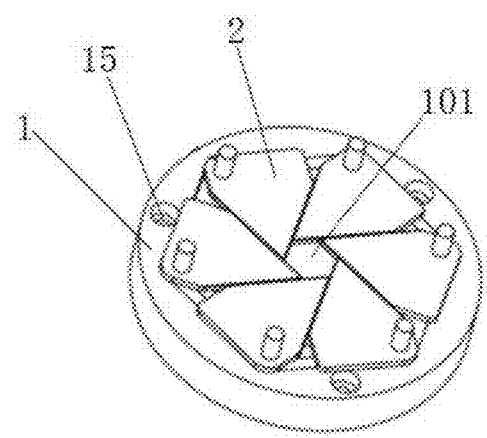 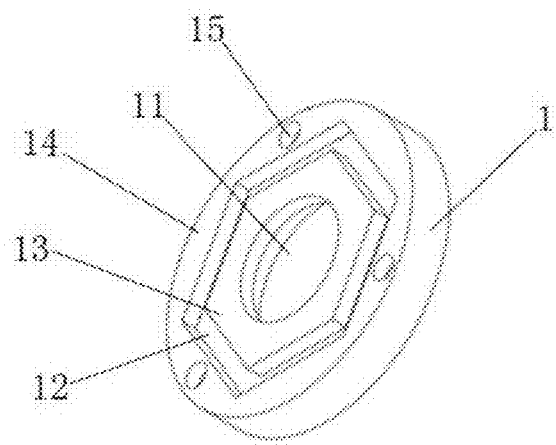
FIG. 4  FIG. 5
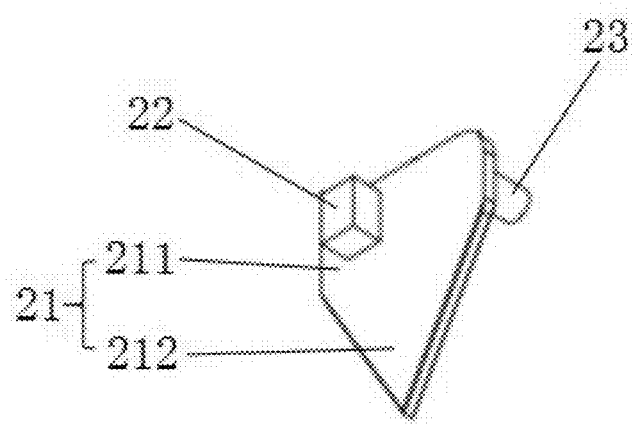
FIG. 6A

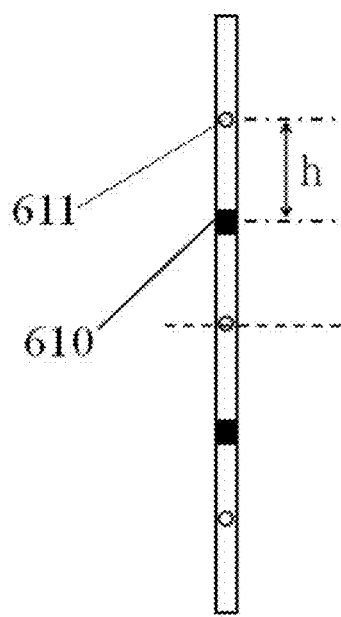 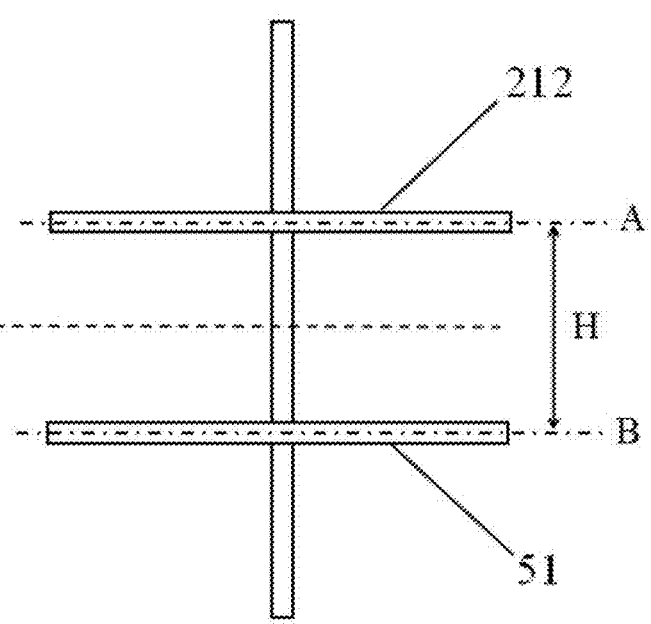
FIG. 6B        FIG. 6C
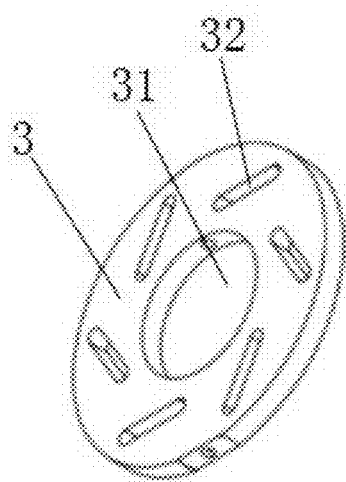 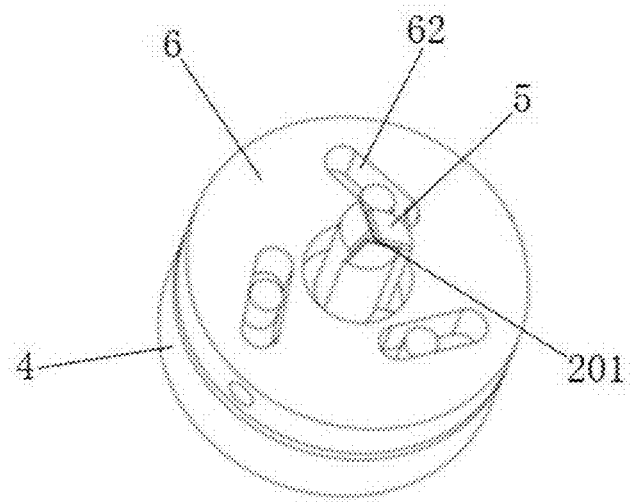
FIG. 7        FIG. 8

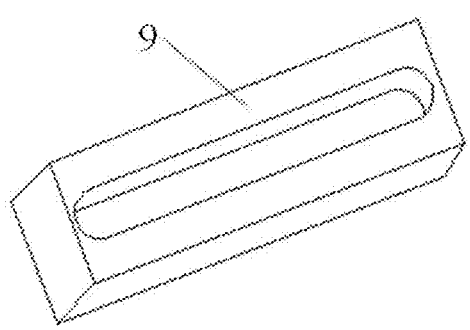 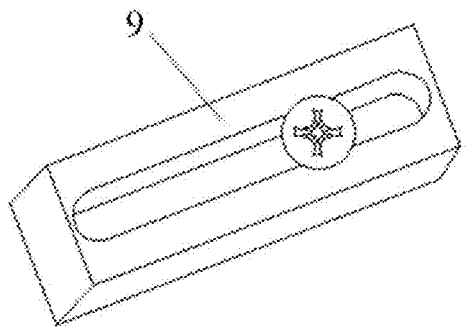
FIG. 22　　　　　　　　FIG. 23
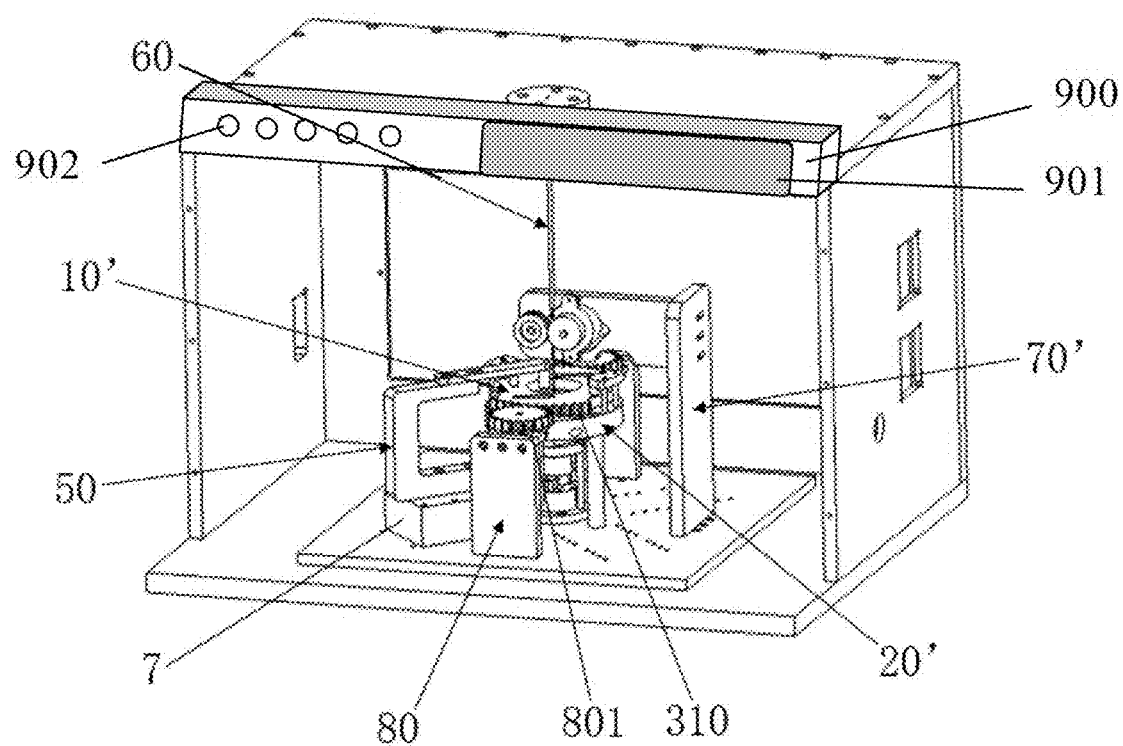
FIG. 24

SEALING APPARATUS, SEALING AND CUTTING DEVICE, AND PROCESSING METHOD

BACKGROUND

Technical Field

The present disclosure relates to a sealing apparatus, and a corresponding sealing and cutting device and a processing method using the same, belonging to the field of mechanical processing apparatuses.

Related Art

In the Chinese patent application No. CN 1307907A, it discloses an iodine-125 seed drug for interventional therapy. This drug uses silver as a carrier of iodine-125. Silver particles, having a length of 3 mm and a diameter of 0.1 mm to 0.6 mm, are arranged in a titanium tube. The preparation method includes the following steps: using silver as a carrier of iodine-125; and coating the carrier silver with the iodine-125 by an ion exchange process, and sealing the silver particles in a titanium tube by soldering to finally prepare the iodine-125 seed. However, this drug needs to be sealed in the titanium tube by soldering, which requires a costly and complicated apparatus and is low in working efficiency.

Drugs for interventional therapy represented by the above drug often need to be produced by a special packaging process. However, related apparatuses in the prior art often fail to meet the requirements.

SUMMARY

The primary technical problem to be solved by the present disclosure is to provide a sealing apparatus.

Another technical problem to be solved by the present disclosure is to provide a sealing and cutting device including the sealing apparatus.

Another technical problem to be solved by the present disclosure is to provide a processing method using the sealing and cutting device.

In order to achieve the above objectives, the present disclosure adopts the following technical solutions:

A first aspect of embodiments of the present disclosure provides a sealing apparatus, including:
- a sealing chassis, arranged fixedly, a center of the sealing chassis being provided with a first central hole;
- a squeezing portion, multiple squeezing portions being provided, and the squeezing portions being movably mounted on the sealing chassis, an end of each of the squeezing portions being located in the first central hole such that the end of each of the multiple squeezing portions located in the first central hole together forms a shrinkable hole; and
- a sealing turntable, the sealing turntable rotatably covering the squeezing portions around an axis of the first central hole, all the squeezing portions being connected with the sealing turntable, and the sealing turntable driving the multiple squeezing portions to move synchronously so as to continuously shrink or expand the shrinkable hole.

A second aspect of embodiments of the present disclosure provides a sealing and cutting device, including a sealing apparatus, a cutting device and a conveyor.

The conveyor is arranged upstream of the sealing apparatus and continuously conveys a strip material along a first direction. The first direction is parallel with an axial direction of the strip material.

The sealing apparatus is reciprocatable along a second direction to squeeze and hot-melt the strip material so as to form a heat-sealed part with a set thickness. The second direction is perpendicular to the axial direction of the strip material.

The cutting device is arranged downstream of the sealing apparatus and is reciprocatable along the second direction so as to cut the heat-sealed part.

The conveyor conveys the strip material along the first direction to the sealing apparatus for hot-melting and sealing so as to form the heat-sealed part. The conveyor continues conveying the strip material to the cutting device such that the heat-sealed part corresponds to the cutting device, thereby completing cutting of the strip material.

A third aspect of embodiments of the present disclosure provides a processing method using the sealing and cutting device, including the following steps:
- conveying, by a conveyor, a material to be processed to a sealing apparatus along an axial direction of the material to be processed;
- squeezing and sealing, by a sealing apparatus, the material to be processed along a radial direction of the material to be processed to form a heat-sealed part with a set thickness;
- continuing conveying, by the conveyor, the sealed material to be processed to a cutting device such that the heat-sealed part corresponds to the cutting device; and
- squeezing and cutting off, by the cutting device, the heat-sealed part of the material to be processed along the radial direction of the material to be processed.

Compared with the prior art, the sealing apparatus and the sealing and cutting device provided by the embodiments the present disclosure are applicable to on-table production, so that the sealing apparatus and the sealing and cutting device can be configured by medical staff on the spot to produce particles with different specifications in the hospital or operating room according to the patient's condition. The sealing apparatus and the sealing and cutting device are also applicable to large-scale production of various particles on a production line for interventional or implantation operations. Moreover, the sealing apparatus and the sealing and cutting device are simple to operate, and have satisfactory working efficiency for medical use, thereby improving the use effects of the interventional or implantation operations. Furthermore, the particles sealed at both ends can be immersed in different drug liquids to prepare different drug-carrying particles, which can be delivered into human bodies or animal bodies on the spot through implantation or interventional operations, so as to realize targeted treatment.

BRIEF DESCRIPTION OF THE DRAWINGS

FIG. 4 is a schematic partial structural view of the sealing apparatus in the first embodiment of the present disclosure;

FIG. 5 is a schematic structural view of a sealing chassis in the first embodiment of the present disclosure;

FIG. 6A is a schematic structural view of a squeezing portion in the first embodiment of the present disclosure;

FIG. 6B is a schematic structural view of a material after sealed;

FIG. 6C is a schematic view showing a positional relationship between the squeezing portion and a cutting edge;

FIG. 7 is a schematic structural view of a sealing turntable in the first embodiment of the present disclosure;

FIG. 8 is a schematic overall structural view of a cutting device in the first embodiment of the present disclosure;

FIG. 22 is a schematic structural view of a limit block;

FIG. 23 is a schematic structural view of the limit block connected with a bolt;

FIG. 24 is a schematic overall structural view of a sealing and cutting device provided by a fourth embodiment of the present disclosure;

DETAILED DESCRIPTION

The technical contents of the present disclosure will be described in detail below with reference to the accompanying drawings and specific embodiments.

First Embodiment

Figure 1:
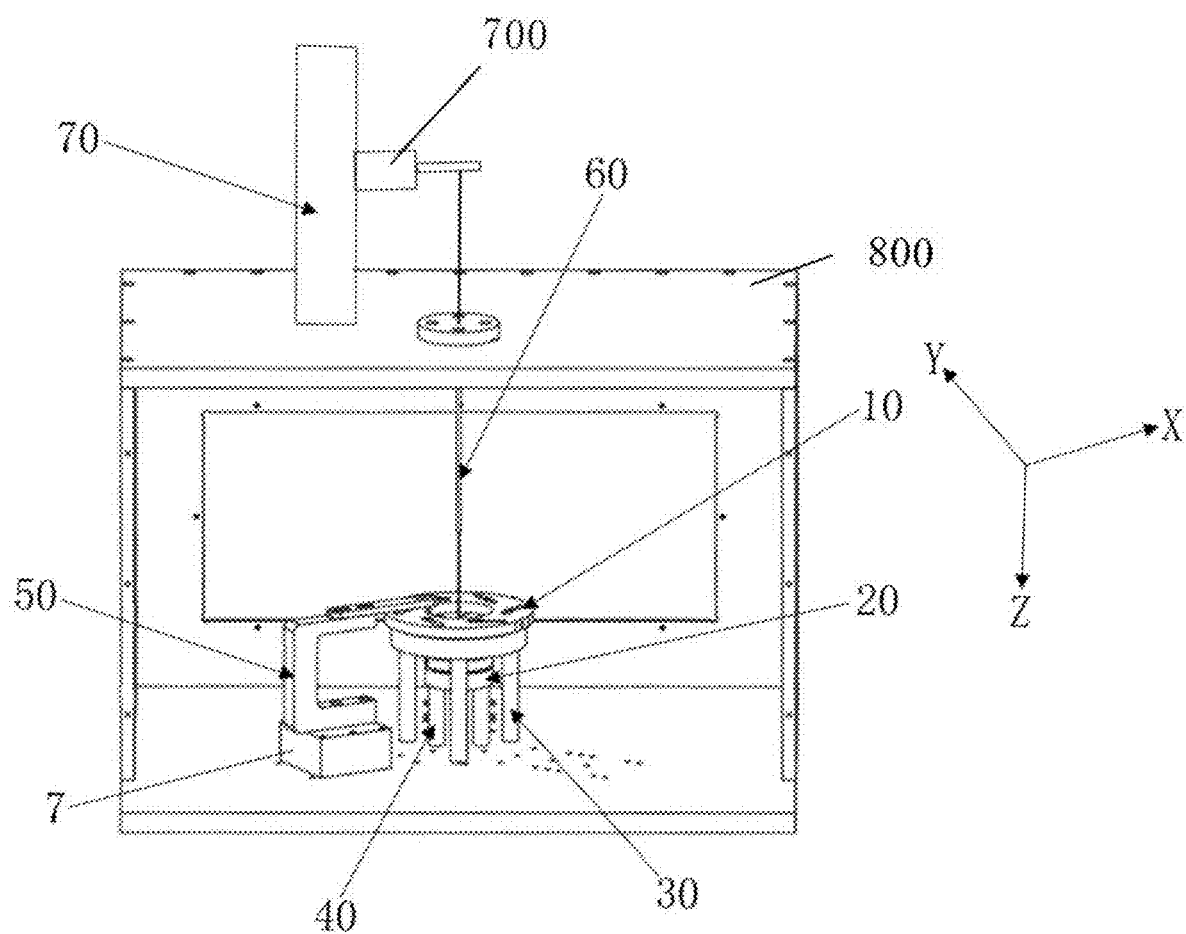
FIG. 1 is a schematic overall structural view of a sealing and cutting device provided by a first embodiment of the present disclosure.
Figure 2:
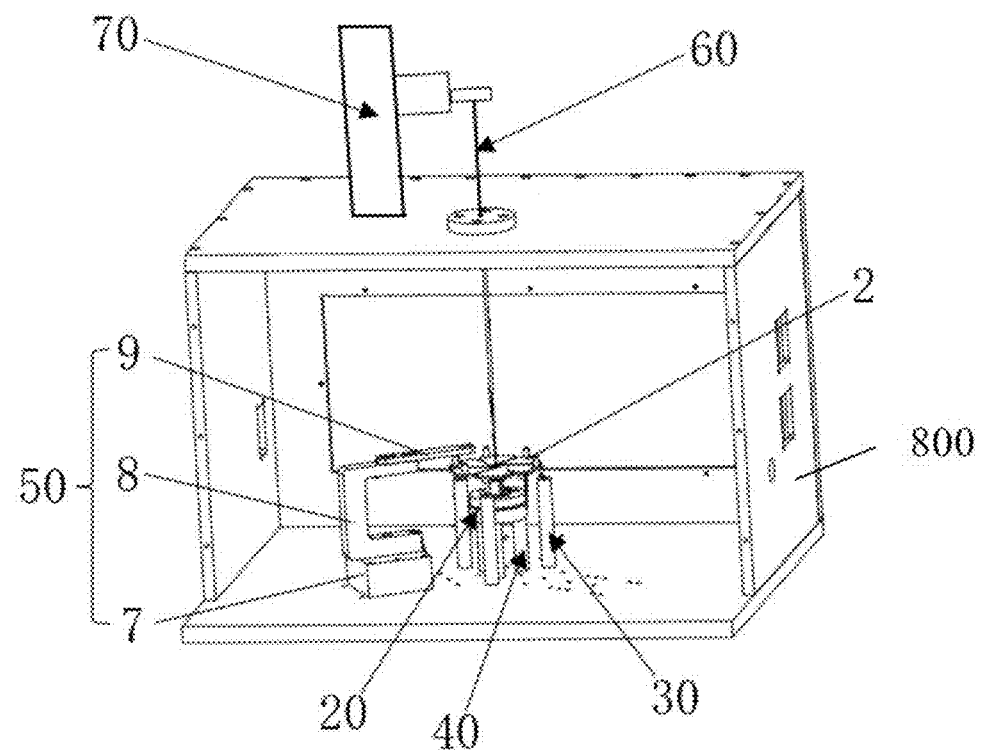
FIG. 2 is a schematic overall structural view of the sealing and cutting device shown in FIG. 1 in a partially disassembled state.

As shown in FIG. 1 and FIG. 2, a sealing and cutting device provided by a first embodiment of the present disclosure includes a sealing apparatus 10, a cutting device 20 and a conveyor 70. The conveyor 70 is configured to convey a strip material 60. The sealing apparatus 10 is configured to seal the material 60. The cutting device 20 is configured to cut the sealed material 60. The conveyor 70 is arranged upstream of the sealing apparatus 10, and the cutting device 20 is arranged downstream of the sealing apparatus 10.

The conveyor 70 is a guide rail structure including a mounting hole 700, so that the material is positioned in the mounting hole 700. The conveyor 70 conveys the material 60 along a first direction (that is, a Z-axis direction in FIG. 1).

In this embodiment, the material 60 is a slender tube made of a degradable material used in medicine, such as PLA or PLGA, or other medical materials. The material 60, i.e., the slender tube, may be previously formed with a particle hole 611 (as shown in FIG. 6A) in a predetermined shape by laser drilling, such that a drug liquid can enter the particle. In this embodiment, a tube diameter of the material 60 is satisfactory for implantation of a puncture needle into a human body or animal body, for example, less than or equal to 2 mm.

As shown in FIG. 6B and FIG. 6C, in this embodiment, the first direction is the advancing direction of the material 60, and accordingly, the sealing apparatus 10 is reciprocatable in a plane perpendicular to the first direction (i.e., a first perpendicular plane A) to squeeze and hot-melt the strip material 60 so as to form a heat-sealed part 610 with a set thickness. At the same time, the cutting device 20 is reciprocatable in a plane perpendicular to the first direction (i.e., a second perpendicular plane B) so as to cut the heat-sealed part 610. A distance H between a sealing surface (i.e., the first perpendicular plane A) of the sealing apparatus 10 and a cutting surface (i.e., the second perpendicular plane B) of the cutting device 20 is the length of one particle (for example, 1 cm to 12 cm).

Specifically, the conveyor 70 first conveys the strip material 60 along the first direction to the sealing apparatus 10 for hot-melting and sealing so as to form the heat-sealed part; and then the conveyor continues conveying the strip material 60 to the cutting device 20 such that the heat-sealed part corresponds to the cutting device 20 (i.e., the cutting surface of the cutting device 20 should be located in the heat-sealed part). The cutting device 20 cuts off the heat-sealed part in the second perpendicular plane, thereby completing cutting of one particle (for example, 8 cm long). After the cutting of one particle is completed, the conveyor 70 continues conveying so as to cut the next particle, such that a continuous cutting mode is formed, thereby improving the production efficiency.

Specifically, as shown in FIG. 3 to FIG. 7, the sealing apparatus 10 includes: a sealing chassis 1, a squeezing portion 2 and a sealing turntable 3. The sealing chassis 1 is a round table. As shown in FIG. 1 and FIG. 2, the sealing chassis 1 is arranged on tops of multiple first upright columns 30, so that the first upright columns 30 can support the sealing chassis 1. A center of the sealing chassis 1 is provided with a first central hole 11. As shown in FIG. 4, multiple squeezing portion 2 are provided, all the squeezing portions 2 are rotatably arranged on a top of the sealing chassis 1, and an end of each of the squeezing portions 2 extends into the first central hole 11 such that the end of each of the multiple squeezing portions 2 extending into the first central hole together forms a shrinkable hole 101. The sealing turntable 3 rotatably covers the squeezing portions 2 around an axis of the first central hole 11, all the squeezing portions 2 are connected with the sealing turntable 3, and the sealing turntable 3 drives the multiple squeezing portions 2 to move together (the squeezing portions actually move horizontally along a groove in the chassis 1) so as to continuously shrink or expand the shrinkable hole 101. Specifically, after the conveyor 70 conveys the material to the sealing apparatus 10, the material 60 enters the shrinkable hole 101. The sealing turntable 3 is rotated to drive the multiple squeezing portions 2 to rotate together, so that the shrinkable hole 101 shrinks continuously, thereby completing sealing of the material. After the sealing is completed, the sealing turntable 3 rotates reversely to drive the multiple squeezing portions 2 to rotate together, so that the shrinkable hole 101 expands to its initial position for sealing next time. It is easily understood that the thickness of the squeezing portion 2 is the thickness of the heat-sealed part formed after the material is hot-melted and sealed, and the thickness of the squeezing portion 2 may be selected adaptively according to needs. Since the material 60 is easy for hot working, heat of the squeezing portions 2 is sufficient to fuse the heat-sealed part together to form a seal.

As shown in FIG. 5, in the above embodiment, the top of the sealing chassis 1 is provided with a sealing track 12 around the first central hole 11. The sealing track 12 is a regular hexagonal annular groove structure. The sealing track 12 divides the sealing chassis 1 into an inner sealing chassis 13 and an outer sealing chassis 14. The first central hole 11 is provided at a center of the inner sealing chassis 13. The outer sealing chassis 14 is provided with multiple sealing chassis mounting holes 15. By using the sealing chassis mounting holes 15, the sealing chassis 1 can be fixed to the tops of the multiple first upright columns 30 such that the relative position of the sealing chassis 1 can be fixed. Moreover, a size of the first central hole 11 may be determined according to needs, which can reduce the weight of the sealing chassis 1 on the premise that the material can pass through the first central hole.

Figure 3:
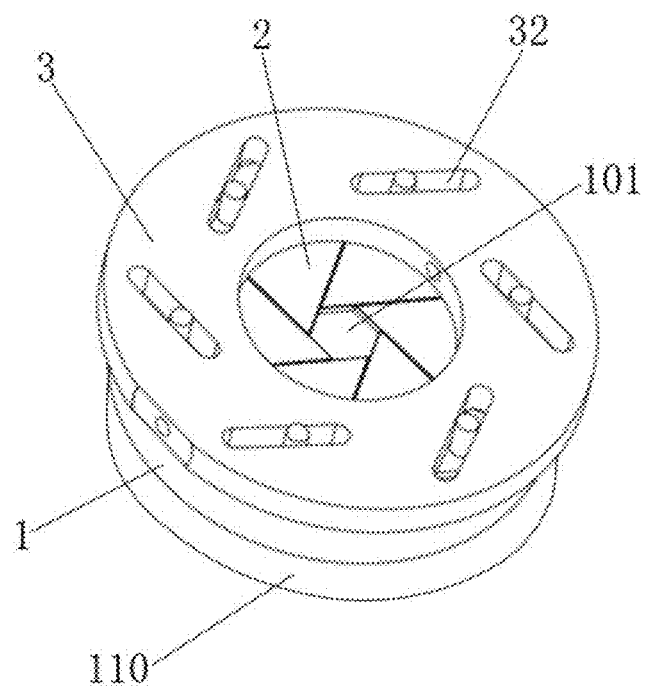
FIG. 3 is a schematic overall structural view of a sealing apparatus in FIG. 1.

As shown in FIG. 4 and FIG. 6A, six squeezing portions 2 are provided. Each of the squeezing portions 2 includes a pressure plate 21, a track column 22 and a rotary column 23. The pressure plate 21 includes a rectangular plate 211 and an equilateral triangular plate 212. One side of the equilateral triangular plate 212 and a long side of the rectangular plate 211 share a common side. Moreover, as shown in FIG. 3 and FIG. 4, all the six equilateral triangular plates 212 extend into the first central hole 11 so as to form the regular hexagonal shrinkable hole 101. The track column 22 is arranged on a bottom of the rectangular plate 211 of the pressure plate 21. The track column 22 is a cuboid bump. A width of the cuboid bump should be matched with a width of the sealing track 12, so that the track column 22 can enter the sealing track and rotatably move in the sealing track. It can be understood that the purpose of designing the track column 22 as a cuboid bump is to make two sides of the cuboid bump abut against two opposite inner walls of the sealing track 12 so as to perform a limit function, thereby avoiding irregular rotation of the pressure plate 21. The rotary column 23 is arranged on a top of the rectangular plate 211. The rotary column is a cylinder configured to be connected with the sealing turntable 3 so as to realize power transmission.

As shown in FIG. 7, the sealing turntable 3 is a ring-shaped disk-like structure. A center of the sealing turntable is provided with a sealing work hole 31 which allows the material to pass through and can reduce the weight of the sealing turntable 3. The sealing turntable 3 is provided with first movable holes 32 at positions corresponding to the rotary columns 23 of the squeezing portions 2. Six first movable holes 32 are provided and are strip-shaped. The six first movable holes 32 are uniformly distributed along a clockwise direction, and extension lines of center lines of the six first movable holes 32 can be combined into a regular hexagon. The rotary column 23 runs through the first movable hole 32 and is movable in the first movable hole 32, thereby realizing transmission connection with the sealing turntable 3.

During the specific working process, after the conveyor 70 conveys the material into the shrinkable hole 101, the sealing turntable 3 starts to rotate forward so as to drive the rotary columns 23 to move in the first movable holes 32, thereby driving the track columns 22 to move in the sealing track 12. As the track columns 22 move in the sealing track 12, the equilateral triangular plates 212 of the multiple squeezing portions 2 continuously shrink, so that the shrinkable hole 101 continuously shrinks, thereby finally completing sealing. After the sealing is completed, the sealing turntable 3 starts to rotate reversely so as to drive the equilateral triangular plates 212 of the six squeezing portions 2 to continuously expand, so that the shrinkable hole 101 is restored to its initial state for the sealing next time.

As shown in FIG. 3, in the above embodiment, the sealing apparatus 10 further includes a heating portion 110 (the chassis 1 also serves as a heating plate, a heating rod is inserted into a hole on one side of the heating plate, and a temperature sensor is screwed into a hole on one side of the chassis 1). The heating portion 110 may be multiple heating rods, a heating plate, a layer of heating wire, or the like. The heating portion 110 is arranged on a bottom of the sealing chassis 1. Moreover, the sealing chassis 1 and the multiple squeezing portions 2 are all made of a heat-conducting material (for example, a metal material such as copper or iron). When the heating portion 110 starts heating, heat is conducted to the multiple squeezing portions 2 via the sealing chassis 1, so that the equilateral triangular plates 212 of the multiple squeezing portions 2 reach a preset temperature. When sealing the material 60, the sealability of the sealed material can be ensured by squeezing and hot-melting, thereby improving the sealing effect of the material.

Figure 9:
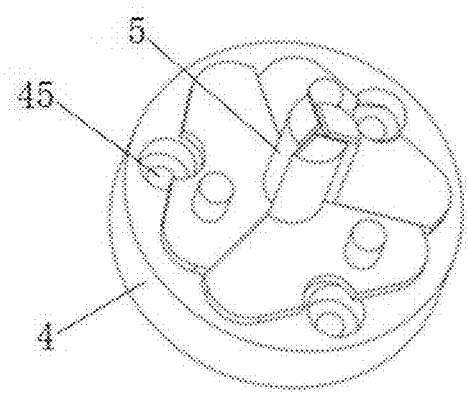
FIG. 9 is a schematic partial structural view of the cutting device in the first embodiment of the present disclosure.

As shown in FIG. 8 to FIG. 13, the cutting device 20 includes: a cutting chassis 4, a cutting portion 5 and a cutting turntable 6. The cutting chassis 4 is a round table. As shown in FIG. 1 and FIG. 2, the cutting chassis 4 is arranged on tops of multiple second upright columns 40, so that the second upright columns 40 can support the cutting chassis 4. A center of the cutting chassis 4 is provided with a second central hole 41, and a central axis of the second central hole 41 coincides with the central axis of the first central hole 11. As shown in FIG. 9, multiple cutting portions 5 are provided, the cutting portions 5 are movably mounted on a top of the sealing chassis 1, and each of the cutting portions 5 includes a cutting edge 51 located in the second central hole 41, so that cutting edges 51 of the multiple cutting portions 5 can be used for cutting. The cutting turntable 6 rotatably covers the cutting portions 5 around the axis of the second central hole 41, all the cutting portions 5 are connected with the cutting turntable 6, and the cutting turntable 6 drives the multiple cutting portions 5 to rotate together such that the cutting edges 51 of the multiple cutting portions 5 squeeze each other or are separated from each other, thereby completing cutting.

Specifically, after the material is sealed, the conveyor 70 continues conveying the material to the cutting device 20, the sealed material enters a cutting hole 201 formed by the cutting edges 51 of the multiple cutting portions 5. The cutting turntable 6 is rotated to drive the multiple cutting portions 5 to rotate together, so that the multiple cutting edges 51 squeeze each other, thereby cutting off the material. The material that has been cut off falls naturally. A collecting box may be placed below the cutting chassis 4 to collect the material that has been cut off. After the material is cut off, the cutting turntable 6 rotates reversely, so that the cutting edges 51 of the multiple cutting portions 5 are separated from each other to form the cutting hole 201 again for the cutting next time.

Figure 10:
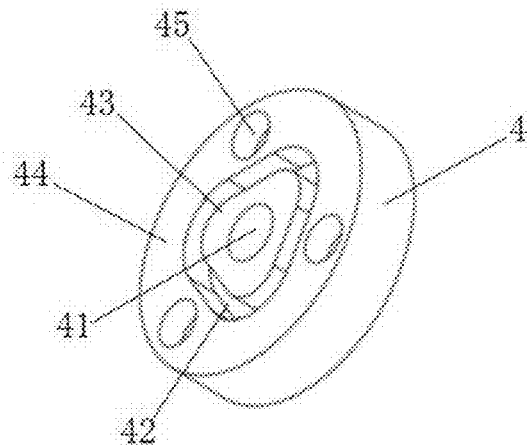
FIG. 10 is a schematic structural view of a cutting chassis in the first embodiment of the present disclosure.

As shown in FIG. 10, in the above embodiment, a top of the cutting chassis 4 is provided with a cutting track 42 around the second central hole 41. The cutting track 42 is an equilateral triangular annular groove structure. The cutting track 42 divides the cutting chassis 4 into an inner cutting chassis 43 and an outer cutting chassis 44. The second central hole 41 is provided at a center of the inner cutting chassis 43. The outer cutting chassis 44 is provided with multiple cutting chassis mounting holes 45. By using the cutting chassis mounting holes 45, the cutting chassis 4 can be fixed to the tops of the multiple second upright columns 40 such that the relative position of the cutting chassis 4 can be fixed. Moreover, a height of the second upright column 40 is less than a height of the first upright column 30, so that the cutting chassis 4 is located below the sealing chassis 1. In addition, a size of the second central hole 41 may be determined according to needs, which can reduce the weight of the cutting chassis 4 on the premise that the material can pass through the second central hole.

Figure 11:
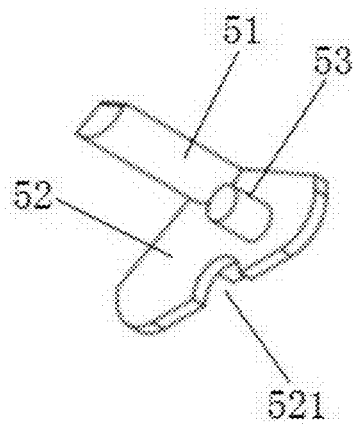
FIG. 11 is a schematic structural view of a cutting portion in the first embodiment of the present disclosure.
Figure 12:
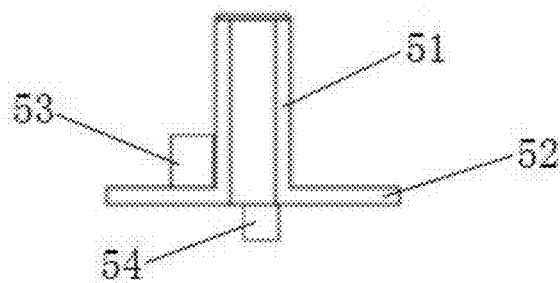
FIG. 12 is a schematic front structural view of the cutting portion in the first embodiment of the present disclosure.

As shown in FIG. 11 and FIG. 12, each of the cutting portions 5 includes the cutting edge 51, a cutting plate 52, a movable column 53 and a positioning column 54. The cutting plate 52 is substantially a triangular plate with an apex angle of 120°. A side of the triangular plate opposite to the apex angle is provided with a notch portion 521. A size of the notch portion 521 corresponds to a size of the cutting chassis mounting hole 45 in the cutting chassis 4. The cutting edge 51 is a column arranged on a top of the cutting plate 52, and a cross section of the cutting edge 51 is fan-shaped with an apex angle of 120°. The cutting edge 51 is arranged at the apex angle of the cutting plate 52, so that two bevels of the cutting edge 51 are respectively coplanar with two bevels of the cutting plate 52 at the apex angle. The movable column 53 is arranged on the top of the cutting plate 52 and is parallel with the cutting edge 51. The movable column 53 is a cylinder configured to be connected with the cutting turntable 6 so as to realize power transmission. The positioning column 54 is arranged on a bottom of the cutting plate 52 and located in the cutting track 42, and the positioning column 54 is rotatably movable in the cutting track 42. Preferably, the positioning column 54 is cuboid, and a width of the cuboid positioning column 54 is matched with a width of the cutting track 42 so as to limit the cutting plate 52.

Figure 13:
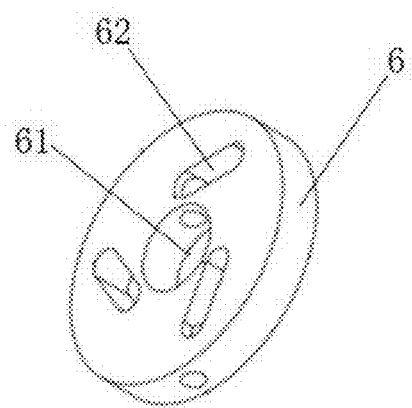
FIG. 13 is a schematic structural view of a cutting turntable in the first embodiment of the present disclosure.

As shown in FIG. 13, the cutting turntable 6 is a ring-shaped disk-like structure, and a center of the cutting turntable is provided with a cutting work hole 61 which allows the material to pass through and can reduce the weight of the cutting turntable. Moreover, the cutting turntable 6 is provided with second movable holes 62 at positions corresponding to the movable columns 53 of the cutting portions 5. Three second movable holes 62 are provided and are strip-shaped. The three second movable holes 62 are uniformly distributed along a clockwise direction, and extension lines of center lines of the three second movable holes 62 can be combined into an equilateral triangle. The movable column 53 runs through the second movable hole 62 and is movable in the second movable hole 62, thereby realizing transmission connection with the cutting turntable 6.

During the specific working process, after the conveyor 70 conveys the sealed material into the cutting hole 201, the cutting turntable 6 starts to rotate forward so as to drive the movable column 53 to move in the second movable hole 62, thereby driving the positioning columns 54 to move in the cutting track 42. As the cutting turntable rotates, the cutting edges 51 of the multiple cutting portions 5 continuously squeeze each other so as to cut off the material. After the material is cut off, the cutting turntable 6 starts to rotate reversely so as to drive the three cutting edges 51 to be separated from each other, so that the cutting hole 201 is restored to its initial state for the cutting next time.

Second Embodiment

As shown in FIG. 14 to FIG. 19, a sealing and cutting device provided by a second embodiment of the present disclosure includes a sealing apparatus 10', a cutting device 20 and a conveyor 70. This embodiment is different from the first embodiment in that the structural form of the sealing apparatus 10' is different.

Figure 14:
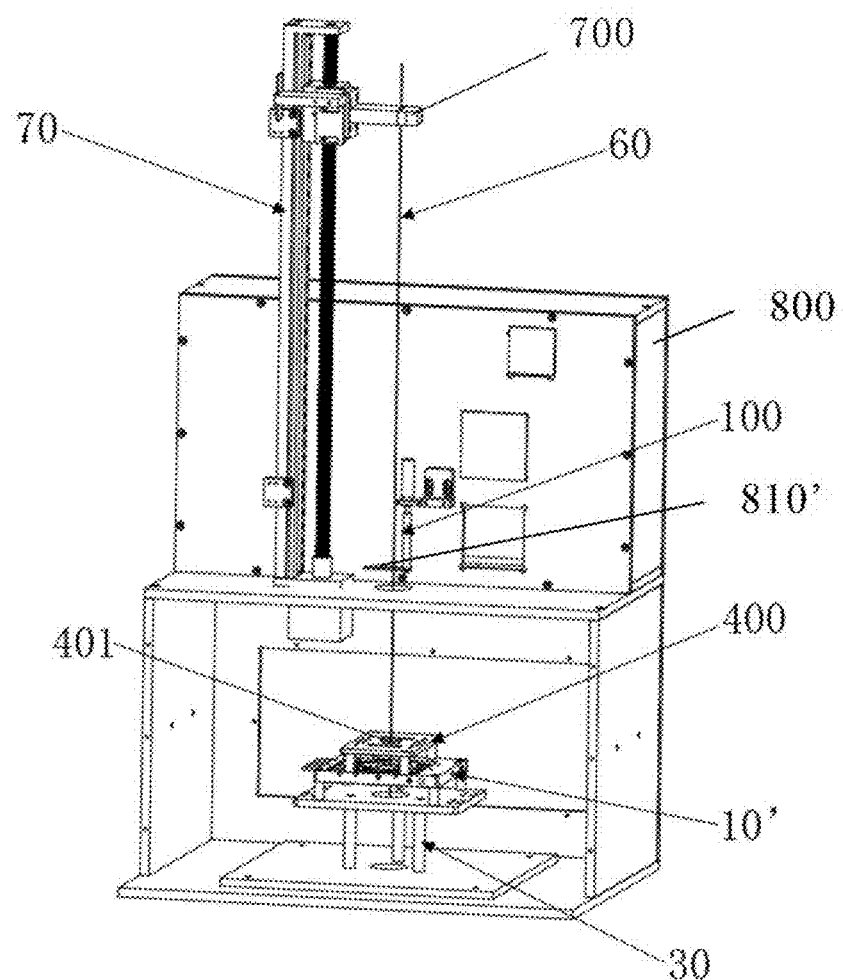
FIG. 14 is a schematic structural view of a sealing and cutting device with a cutting device omitted in a second embodiment of the present disclosure.
Figure 15:
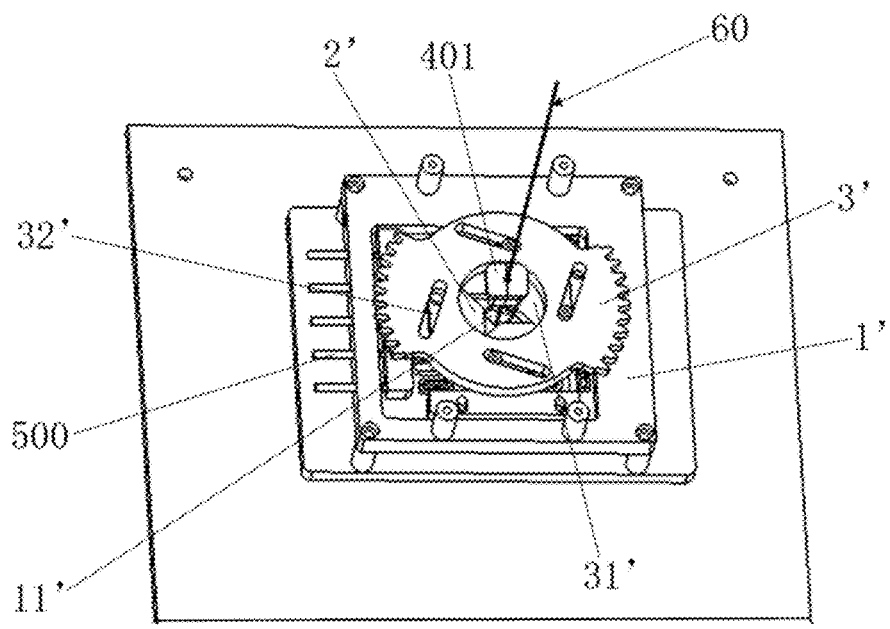
FIG. 15 is a schematic overall structural view of a sealing apparatus in the second embodiment of the present disclosure.
Figure 16:
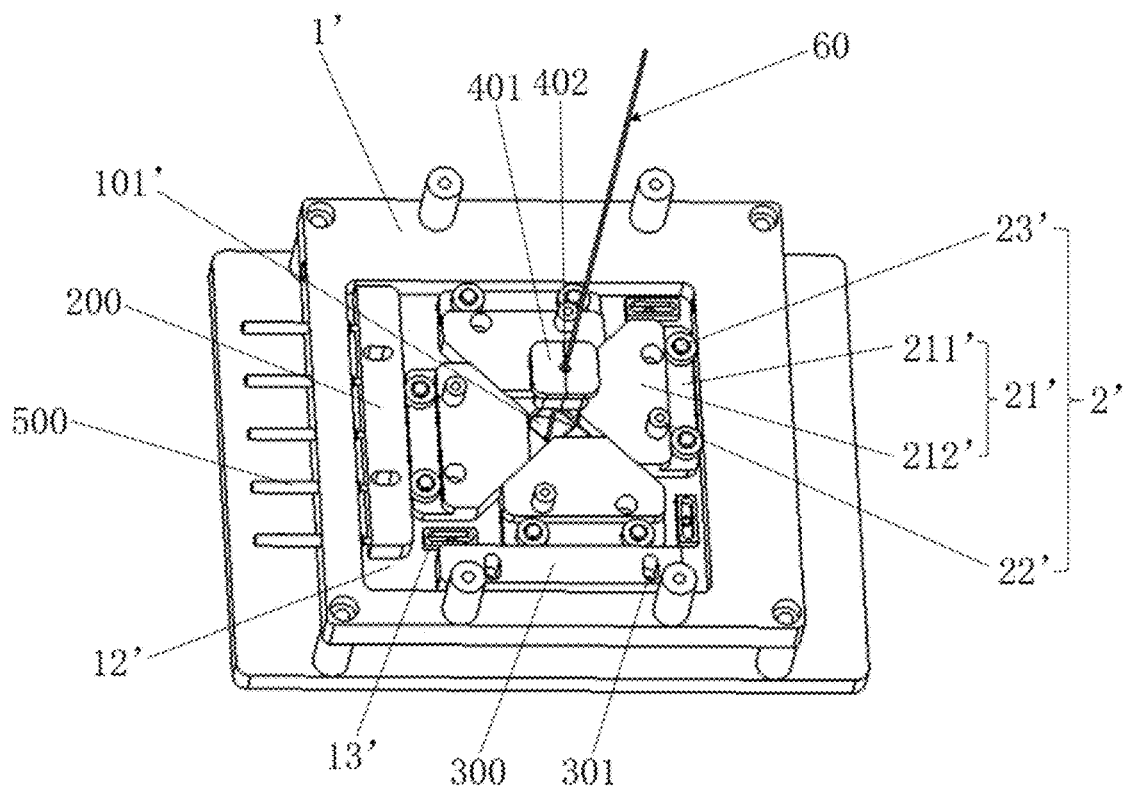
FIG. 16 is a schematic structural view of the sealing apparatus with a sealing turntable omitted in the second embodiment of the present disclosure.
Figure 17:
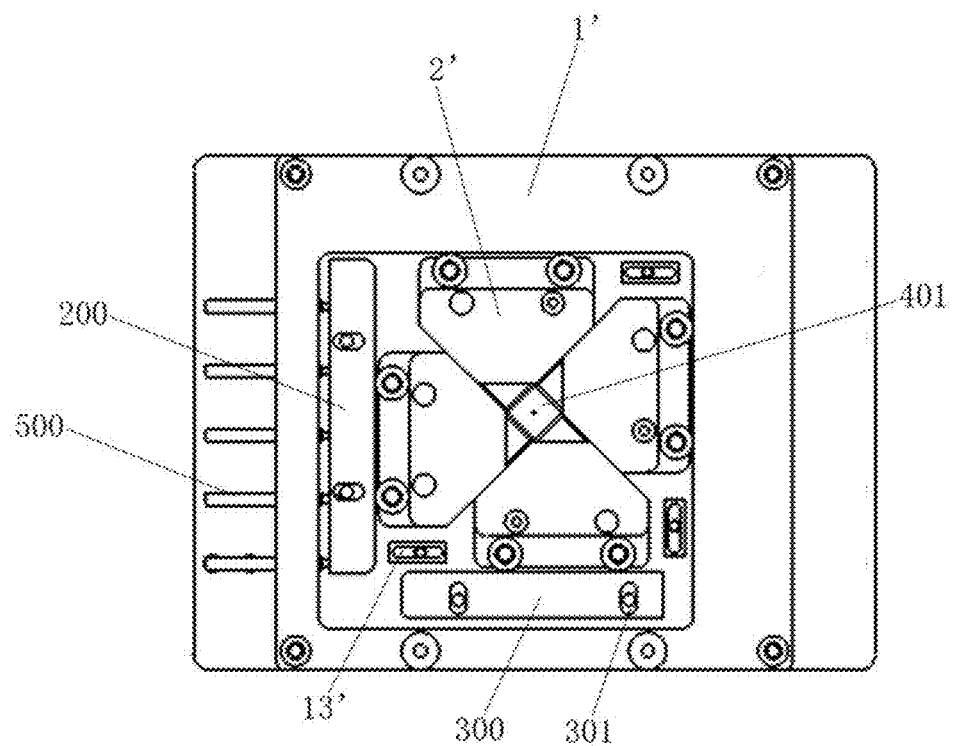
FIG. 17 is a schematic structural view of multiple squeezing portions before sealing in the second embodiment of the present disclosure.
Figure 18:
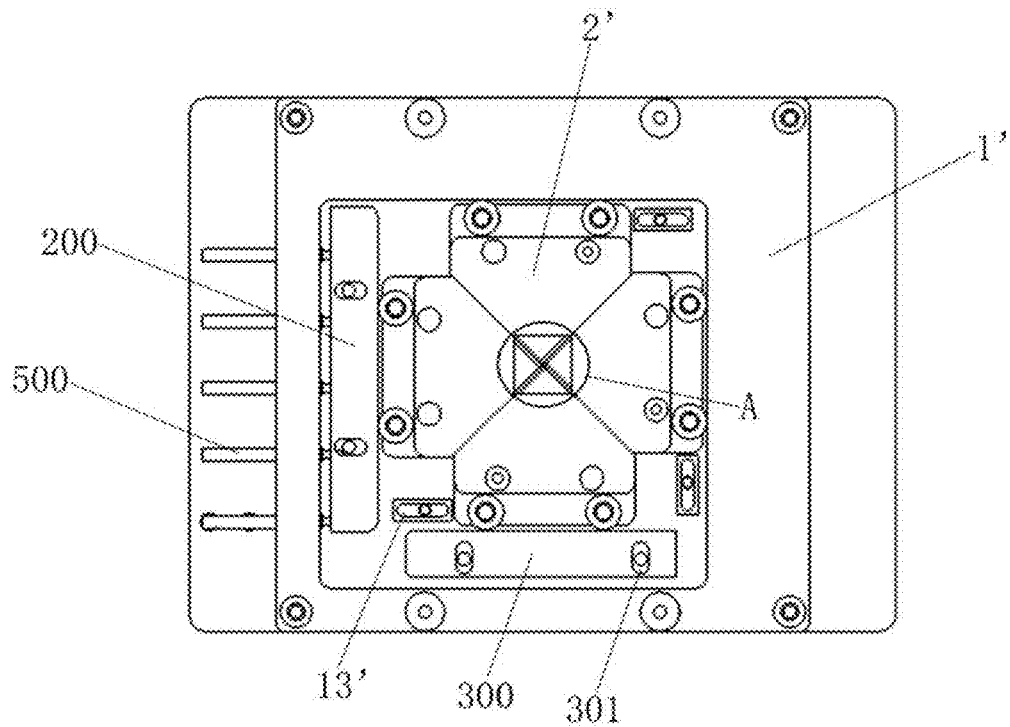
FIG. 18 is a schematic structural view of the multiple squeezing portions after sealing in the second embodiment of the present disclosure.
Figure 19:
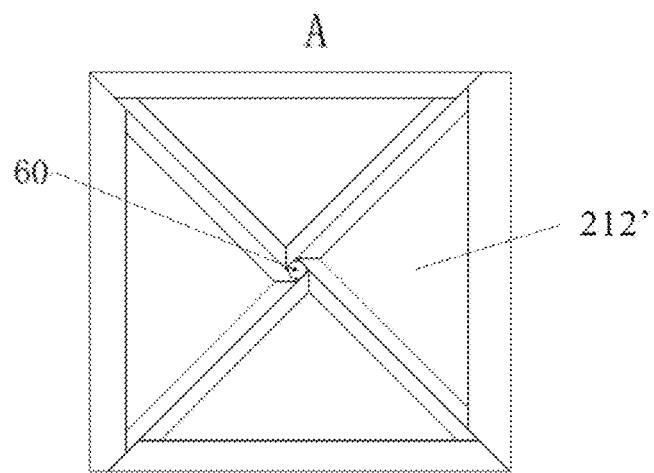
FIG. 19 is a partial enlarged view of A in FIG. 18.

Specifically, as shown in FIG. 15 to FIG. 16, the sealing apparatus 10' includes a sealing chassis 1', a squeezing portion 2' and a sealing turntable 3'. The sealing chassis 1' is a rectangular platform. As shown in FIG. 14, the sealing chassis 1' is arranged on tops of multiple first upright columns 30, so that the first upright columns 30 can support the sealing chassis 1'. A center of the sealing chassis 1' is provided with a regular polygonal first central hole 11' (which is square in this embodiment, and may be in other shapes such as a regular pentagon or a regular hexagon in other embodiments). As shown in FIG. 16, multiple (four in this embodiment) squeezing portions 2' are provided, so that the number of the squeezing portions 2' is the same as the number of sides of the first central hole 11'. Moreover, all the squeezing portions 2' are located in the first central hole 11' such that an end of each of the multiple squeezing portions 2' away from an inner wall of the first central hole 11' together forms a shrinkable hole 101'. The multiple squeezing portions 2' are respectively movably arranged on an inner wall where one side of the regular polygonal first central hole 11' is located. All the squeezing portions 2' are connected with the sealing turntable 3', and the sealing turntable 3' drives the multiple squeezing portions 2' to move along the corresponding inner walls so as to continuously shrink or expand the shrinkable hole 101'.

Specifically, after the conveyor 70 conveys the material to the sealing apparatus 10', the material enters the shrinkable hole 101'. The sealing turntable 3' is rotated to drive the multiple squeezing portions 2' to translate synchronously, so that the shrinkable hole 101' shrinks continuously, thereby completing sealing of the material. After the sealing is completed, the sealing turntable 3' rotates reversely to drive the multiple squeezing portions 2' to translate reversely, so that the shrinkable hole 101' expands to its initial position for sealing next time. It is easily understood that the thickness of the squeezing portion 2' is the thickness of the heat-sealed part formed after the material is hot-melted and sealed, and the thickness of the squeezing portion 2' may be selected adaptively according to needs.

As shown in FIG. 15, a limit step 12' is formed in the first central hole 11' of the sealing chassis 1', and all the squeezing portions 2' are placed on the limit step 12'. In this embodiment, the limit step 12' is a square annular plate arranged on the inner wall of the first central hole 11' so as to provide a foundation for placing the squeezing portions 2', so that the squeezing portions 2' can be placed on the square annular plate and fit the inner wall of the first central hole 11'.

As shown in FIG. 16, four squeezing portions 2' are provided, and each of the squeezing portions 2' includes a pressure plate 21', a rotary column 22' and a rolling bearing 23'. The pressure plate 21' includes a rectangular plate 211' and an equilateral triangular plate 212', and the equilateral triangular plate 212' is located in the first central hole 11'. One side of the equilateral triangular plate 212' and a long side of the rectangular plate 211' share a common side. Moreover, in this embodiment, the four equilateral triangular plates 212' are all located in the first central hole 11', thereby forming the square shrinkable hole 101'. The rotary column 22' is arranged on a top of the pressure plate 21'. The rotary column is a cylinder configured to be connected with the sealing turntable 3' so as to realize power transmission. The rolling bearing 23' is arranged on the rectangular plate 211' of the pressure plate 21' and is in contact with the inner wall of first central hole 11'. It can be understood that when the sealing turntable 3' drives the squeezing portions 2' to move along the inner wall of the first central hole 11', the rolling bearing 23' can replace sliding friction into rolling friction so as to reduce the friction force between the squeezing portions 2' and the inner wall of the first central hole 11', thereby making the sealing more convenient.

As shown in FIG. 15, the sealing turntable 3' is a ring-shaped disk-like structure. A center of the sealing turntable is provided with a sealing work hole 31' which allows the material to pass through and can reduce the weight of the sealing turntable 3'. The sealing turntable 3' is provided with first movable holes 32' at positions corresponding to the rotary columns 22' of the squeezing portions 2'. Four first movable holes 32' are provided and are strip-shaped. The four first movable holes 32' are uniformly distributed along a clockwise direction, and extension lines of center lines of the four first movable holes 32' can be combined into a square. The rotary column 22' runs through the first movable hole 32' and is movable in the first movable hole 32', thereby realizing transmission connection with the sealing turntable 3'.

As shown in FIG. 14, in the above embodiment, the sealing and cutting device further includes a positioner 100. The positioner 100 is arranged on one side of the material 60. An output of the positioner 100 is provided with a positioner 810'. The positioner 100 can drive the positioner 810' to reciprocate in a vertical direction so as to adjust the specific position of the positioner 810', thereby positioning the size of the material 60. The positioner 100 may also be removed, and the size is adjusted manually.

Specifically, after the conveyor 70 conveys the material 60 in place, it is required to make the positioner 100 drive the positioner 810' to move up or down, so that the position of the positioner 810' can be matched with the material 60. If a distance between the positioner 810' and the cutting edge 51 is defined as D, then D=nH+h. n is a positive integer, H is a length of a single particle after cutting the material 60, and h is a distance from a particle hole 611 in the material 60 to the nearest heat-sealed part 610 below after the particle hole 611 is aligned with the positioner 810'. For example, in FIG. 6A, a center between adjacent two heat-sealed parts 610 is provided with one particle hole 611, and then the distance h from the particle hole 611 to the nearest heat-sealed part 610 below is ½H. After the position of the positioner 810' is determined, a starting signal is sent out to start the sealing turntable 3', and then the started sealing turntable 3' starts a cyclic working mode.

During the specific working process, after the conveyor 70 conveys the material into the shrinkable hole 101', the output of the starter 100 moves down so as to be aligned with the sealing turntable 3' and sends a starting signal to a power mechanism for controlling the sealing turntable 3'. Then, the sealing turntable 3' starts to rotate forward so as to drive the rotary columns 22' to move in the first movable holes 32', thereby driving the rolling bearing 23' to move along the inner wall of the first central hole 11'. As the rolling bearings 23' continuously move along the inner wall of the first central hole 11', the equilateral triangular plates 212' of the four squeezing portions 2' continuously shrink, so that the shrinkable hole 101' continuously shrinks, thereby finally completing sealing. After the sealing is completed, the sealing turntable 3' starts to rotate reversely so as to drive the equilateral triangular plates 212' of the four squeezing portions 2' to continuously expand, so that the shrinkable hole 101' is restored to its initial state for the sealing next time.

In the above embodiment, preferably, the sealing apparatus further includes an elastic limit block 200 and an adjustable positioning block 300. The elastic limit block 200 is a rectangular plate. The elastic limit block is placed on the limit step 12' and close to the inner wall where one side of the regular polygon is located. One side (i.e., the left side in FIG. 16) of the elastic limit block 200 is connected with multiple spring columns 500, and the multiple spring columns 500 push the elastic limit block 200 close to the squeezing portions 2' such that an other side (i.e., the right side in FIG. 16) of the elastic limit block 200 comes into contact with the rectangular plate 211' of the squeezing portion 2'. Thus, the combination of the spring columns 500 and the elastic limit block 200 can provide a certain elastic thrust for one of the squeezing portions 2', so that the equilateral triangular plates 212' of the four squeezing portions 2' can be in close contact so as to ensure the squeezing effect. Moreover, the elastic thrust should not be too large, so as to prevent excessive friction between the four squeezing portions 2' from causing jamming. The adjustable positioning block 300 is also a rectangular plate. The adjustable positioning block 300 is placed on the limit step 12' and close to the inner wall where another side of the regular polygon is located (in this embodiment, the adjustable positioning block 300 and the elastic limit block 200 are arranged adjacent to each other, and of course, they may be arranged opposite to each other). The adjustable positioning block 300 is provided with an elongated hole 301 so as to be connected with the limit step 12' through a bolt, and when the position of the adjustable positioning block 300 needs to be adjusted, a mounting position of the adjustable positioning block 300 can be adjusted by adjusting a position of the connecting bolt in the elongated hole 301, thereby adjusting relative positions of the four squeezing portions 2'. It can be understood that after the relative positions of the four squeezing portions 2' are changed, the position of the shrinkable hole 101' formed by the four squeezing portions 2' is changed accordingly, so that the position of the shrinkable hole 101' can be adjusted according to different materials.

In addition, as shown in FIG. 16, in the above embodiment, the limit step 12' is further provided with multiple limit blocks 13', and the limit blocks 13' are each arranged on one side of each of the squeezing portions 2' so as to limit a movement distance of the squeezing portion 2'. In this embodiment, four limit blocks 13' are provided, and each of the limit block 13' is located on the right side of one of the squeezing portions 2'. When the sealing turntable 3' rotates clockwise, the four squeezing portions 2' move toward their respective left sides, thereby continuously shrinking the shrinkable hole 101'. On the contrary, when the sealing turntable 3' rotates counterclockwise, the four squeezing portions 2' move toward their respective right sides, thereby continuously expanding the shrinkable hole 101'. During this process, after the squeezing portion 2' moves a certain distance, it will contact the limit block 13', which thereby prevents the squeezing portion 2' from moving further, thereby improving the operational safety of the device.

As shown in FIG. 14, in the above embodiment, a positioning bracket 400 is further arranged above the sealing turntable 3'. The positioning bracket 400 is provided with two positioning clamping blocks 401. The two positioning clamping blocks 401 are joined each other to form a positioning clamping hole 402. The material 60 runs through the positioning clamping hole 402 such that the material 60 can be positioned, thereby improving the conveying stability of the material 60.

Third Embodiment

On the basis of the first embodiment, still referring to FIG. 1 and FIG. 2, the sealing and cutting device further includes an adjusting device 50. The adjusting device 50 includes a moving base 7, a limit seat 8 and a limit member 9. The moving base 7 is configured to adjust position. The limit seat 8 is configured to provide a mounting foundation for the limit member 9. The limit member 9 is configured to limit the position of the material.

Specifically, in this embodiment, the moving base 7 is a double-shaft moving module purchased on the market. Referring to the coordinate system shown in FIG. 1, the conveyor 70 conveys the material 60 along a Z direction, and the moving base 7 is arranged on one side (left side, right side, front side or rear side in FIG. 1) of the sealing apparatus 10. The moving base 7 is movable along an X direction and a Y direction, so that the position of the moving base 7 in the horizontal plane can be adjusted. It can be understood that if the conveyor conveys the material along the X direction, then the double-shaft moving module will adjust the position along the Y direction and the Z direction.

Figure 20:
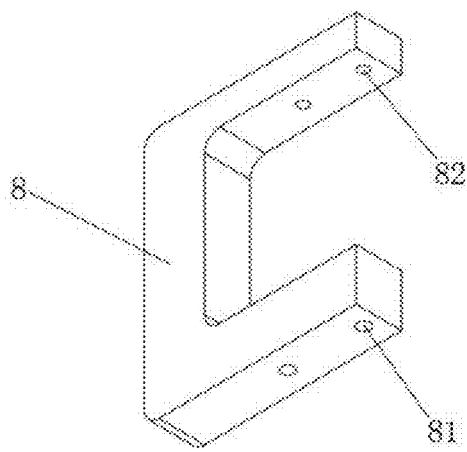
FIG. 20 is a schematic structural view of a limit seat.

As shown in FIG. 20, the limit seat 8 is U-shaped, and an opening of the U-shaped limit seat 8 is arranged horizontally. A bottom of the limit seat 8 is provided with a first connecting hole 81, and a top of the limit seat 8 is provided with a second connecting hole 82. The first connecting hole 81 is configured to be connected with the moving base 7, thereby limiting relative positions of the moving base 7 and the limit seat 8 (which may be connected through a bolt), and the second connecting hole 82 is configured to be detachably connected with the limit member 9.

Figure 21:
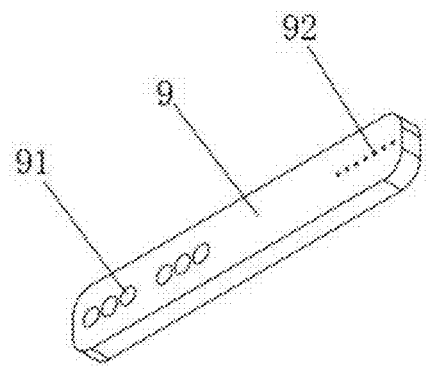
FIG. 21 is a schematic structural view of a limit member.

As shown in FIG. 21, the limit member 9 is a rectangular connecting plate. A first end of the limit member 9 is provided with a third connecting hole 91, and a connecting piece (for example, a bolt) may sequentially pass through the second connecting hole 82 and the third connecting hole 91 so as to connect the limit member 9 to the top of the limit seat 8 through the bolt, so that the limit seat 8 can be detachably connected with the limit member 9. Moreover, a second end of the limit member 9 is provided with at least one limit hole 92. Referring to the coordinate system shown in FIG. 1, an axis of the limit hole 92 is parallel with the axis of the first central hole 11. By adjusting the position of the double-shaft moving module, the axis of the limit hole can coincide with the axis of the first central hole. In this case, the material may pass through the limit hole 92 before entering the sealing apparatus 10. Thus, the limit hole 92 can be used to limit the material, thereby ensuring the stability of the material during the conveying process. It can be understood that a diameter of the limit hole 92 should be matched with a size of the material to be processed. In this embodiment, the material to be processed 60 is a particle tube which has an inner diameter of 0.6 mm and an outer diameter of 0.8 mm and is made of chitosan.

As shown in FIG. 22 and FIG. 23, in another embodiment, the limit member 9 is a cuboid structure with a through slotted hole in the middle. A bolt may pass through the slotted hole and be threadedly connected to a round hole in the device therebelow. The limit position is adjusted through the slotted hole structure in the limit member 9.

In the above embodiment, in order to improve the applicability of the sealing and cutting device, the second end of the limit member 9 may be provided with multiple limit holes 92, and the limit holes 92 have different diameters, so that the limit holes 92 with different diameters can be selected to match different materials.

Fourth Embodiment

As shown in FIG. 24 to FIG. 27, a sealing and cutting device provided by a fourth embodiment of the present disclosure includes a sealing apparatus 10, a cutting device 20' and a conveyor 70'. This embodiment is different from the first embodiment in that in this embodiment, both the cutting device 20' and the conveyor 70' are different from the first embodiment. The differences will be described in detail below.

Figure 25:
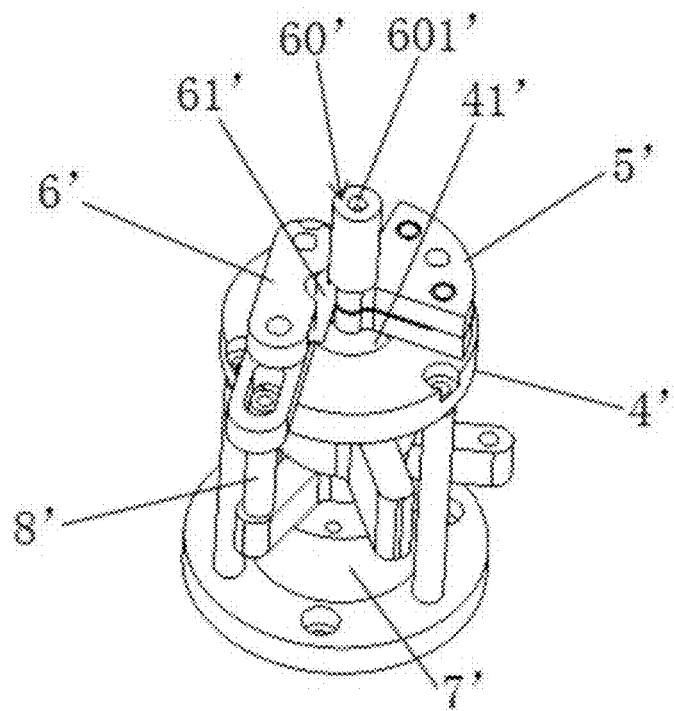
FIG. 25 is a schematic overall structural view of a cutting device in FIG. 24.

As shown in FIG. 25, in this embodiment, the cutting device 20' includes a cutting chassis 4', a positioning portion 5', a cutting portion 6', a power portion 7', a material guiding device 60' and a transmission portion 8'. The cutting chassis 4' is a round disk. A center of the round disk 4' is provided with a work hole 41' along an axial direction (i.e., up-down direction in FIG. 24) which allows a material to pass through. The material guiding device 60' is arranged above the cutting chassis 4' and provided with a guide hole 601'. The material runs through the guide hole 601', so that the material guiding device 60' can guide the material to move.

The positioning portion 5' includes two fan-shaped plates. The two fan-shaped plates are stacked up and down on a top of the cutting chassis 4', and a gap is reserved between the two fan-shaped plates so that a cutting edge can pass through.

The cutting portion 6' is strip-shaped. The cutting portion 6' is rotatably arranged on the top of the cutting chassis 4', and the cutting portion 6' and the positioning portion 5' are respectively located on two sides of the work hole 41'. A side of the cutting portion 6' close to the work hole 41' has a curved notch. A cutter edge 61' is arranged in the curved notch. A thickness of the cutter edge 61' corresponds to the gap between the two fan-shaped plates.

The power portion 7' is a rotary motor or a rotary cylinder. In this embodiment, the power portion is a rotary cylinder. The power portion 7' is arranged below the cutting chassis 4'. A power output of the power portion 7' is connected with the cutting portion 6' through the transmission portion 8', so that the power portion 7' can drive the cutting portion 6' to rotate in a plane of the top of the cutting chassis 4', and thus the cutter edge 61' can be used to cut the material 60. Since the material 60 has a small tube diameter (for example, less than or equal to 2 mm) and is easy to cut, the cutter edge 61' can cut the material quickly.

Figure 26:
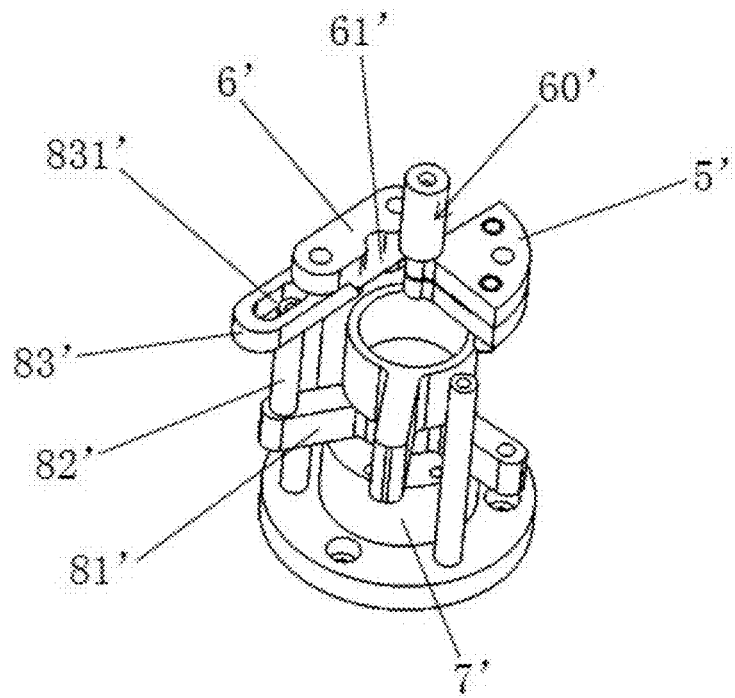
FIG. 26 is a schematic partial structural view of the cutting device in FIG. 24.

As shown in FIG. 26, the transmission portion 8' includes a turntable 81', a transmission rod 82' and a guide rod 83'. The turntable 81' is horizontally mounted on a power shaft of the rotary cylinder. The transmission rod 82' is mounted on the turntable 81' along a vertical direction. The guide rod 83' is arranged along a horizontal direction. The guide rod 83' is provided with a guide hole 831'. The transmission rod 82' runs through the guide hole 831'. The cutting portion 6' is horizontally mounted on the guide rod 83'. Thus, the rotary cylinder 6' drives the turntable 81' rotate so as to drive the transmission rod 82' to rotate, and the transmission rod 82' moves in the guide hole 831' so as to drive the cutting portion 6' mounted on the guide rod 83' to rotate in the plane of the top of the cutting chassis 4', thereby cutting the material.

Moreover, it can be understood that in this embodiment, the rotary cylinder is a reciprocating cylinder. After the cylinder rotates forward once to complete the rotary cutting, the cylinder will rotate reversely, so that all components will return to their initial positions for the cutting next time.

Figure 27:
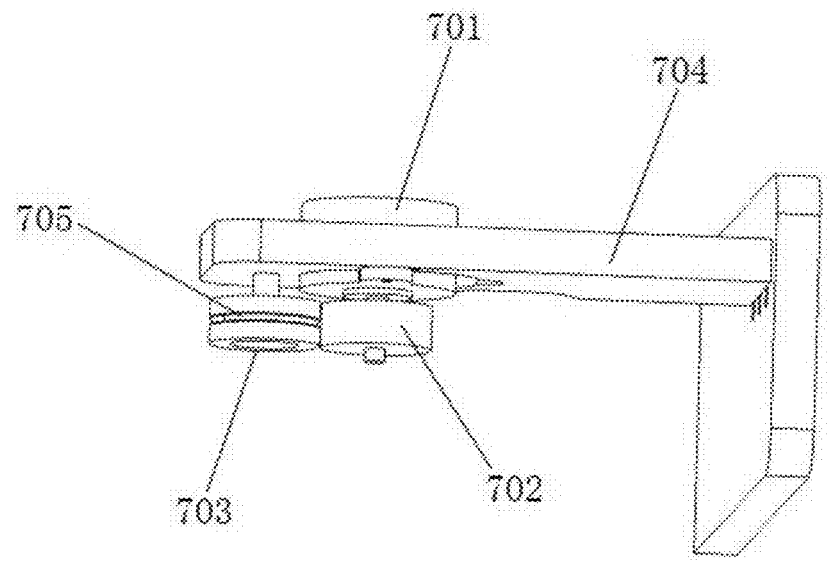
FIG. 27 is a schematic structural view of a conveyor in FIG. 24.

As shown in FIG. 27, in this embodiment, the conveyor 70' specifically includes a stepping motor 701, a stepping wheel 702 and a guide wheel 703. The stepping motor 701 is mounted on a conveying bracket 704. The stepping wheel 702 is mounted on a power output of the stepping motor 701. The guide wheel 703 is rotatably mounted on the conveying bracket 704. Moreover, the guide wheel 703 is arranged in close proximity to the stepping wheel 702. An outer edge of the guide wheel 703 is provided with an annular guide groove 705. A width of the guide groove 705 is matched with the diameter of the material.

During specific conveying, the material passes through the guide groove 705, and the stepping motor 701 drives the stepping wheel 702 to move a set distance (which may be set according to needs, for example, 1 cm, 2 cm, 3 cm or the like). Then the stepping wheel 702 squeezes the material and drives the material to move the set distance, thereby completing the feeding process. Therefore, the guide groove 705 can guide and limit the material, thereby preventing the material from deviation in the feeding process and improves the stability of feeding.

In the above embodiment, the sealing apparatus 10 further includes a rotary power portion 80 (as shown in FIG. 24) configured to provide power. Preferably, the rotary power portion 80 is a rotary cylinder. A power output of the rotary cylinder is provided with a gear 801. Moreover, an outer edge of the sealing turntable 3 is provided with multiple serrations 310. The gear 801 is meshed with the serrations 310, so that the rotation of the rotary cylinder can drive the sealing turntable 3 to rotate clockwise or counterclockwise around the axis of the first central hole.

The sealing and cutting device in this embodiment of the present disclosure further includes a housing 800 configured to support and fix the conveyor 70, the sealing apparatus 10 and the cutting device 20. The housing 800 may be a completely sealed structure to meet the cleanliness requirements of medical apparatuses and the sterility requirements for the particles. As shown in FIG. 24, the sealing and cutting device in this embodiment of the present disclosure further include a control device 900 (for example, Programmable Logic Controller), which includes a display screen 901 and/or multiple buttons 902. Settings of the control device 900 may be changed by the buttons 902 (or a remote controller) so as to produce particles with different specifications.

Fifth Embodiment

Figure 28:
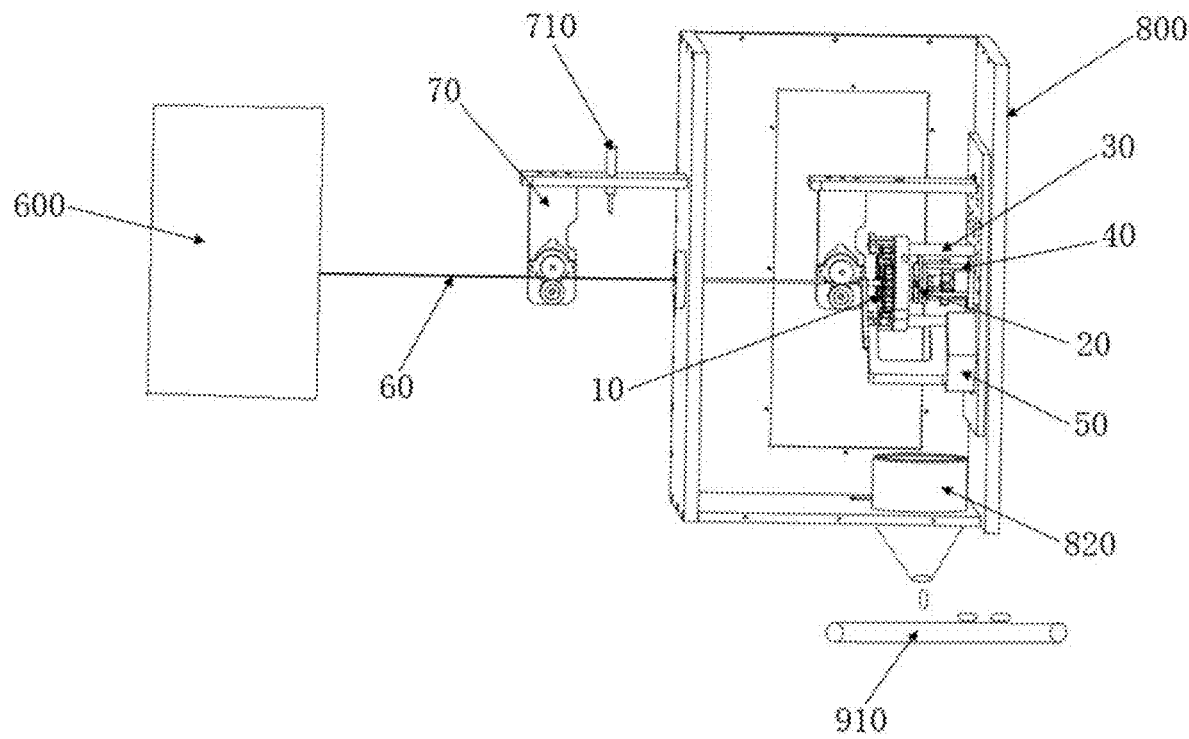
FIG. 28 is a schematic overall structural view of a sealing and cutting device provided by a fifth embodiment of the present disclosure.

On the basis of the fourth embodiment, as shown in FIG. 28, a fifth embodiment of the present disclosure provides another sealing and cutting device. This embodiment is different from the fourth embodiment in that this embodiment is suitable for directly receiving a material 60 from a tube extruder 600 so as to be used for continuous production on a production line.

Specifically, in this embodiment, the tube extruder 600 is arranged upstream of the material guiding device 60', and configured to produce the strip material 60 and supply the strip material to the conveyor 70' along the first direction. It can be understood that by adding a raw material into the tube extruder 600, the strip material 60 can be produced continuously by the tube extruder 600 and thus can be continuously supplied to the sealing and cutting device, thereby realizing the continuous production working mode. In addition, it can be understood that in another embodiment, since the material guiding device 60' is arranged, the conveyor 70' can be removed, and the material 60 can be conveyed only by the extrusion force of the tube extruder 600.

In this embodiment, as shown in FIG. 28, the conveyor 70' is a roller pair structure (one of the rollers is driven by a stepping motor) configured to clamp the material 60 between the rollers, which not only positions the material, but also forms a pulling force on the material 60. The conveyor 70' is further provided with a drill, for example, a laser drill 710, configured to previously drill the material 60. Besides, it can be understood that the frequency of laser drilling may be set according to needs, so as to adjust the drilling spacing in the strip material 60 (i.e., control the number of holes or hole spacing of a single particle).

Figure 29:
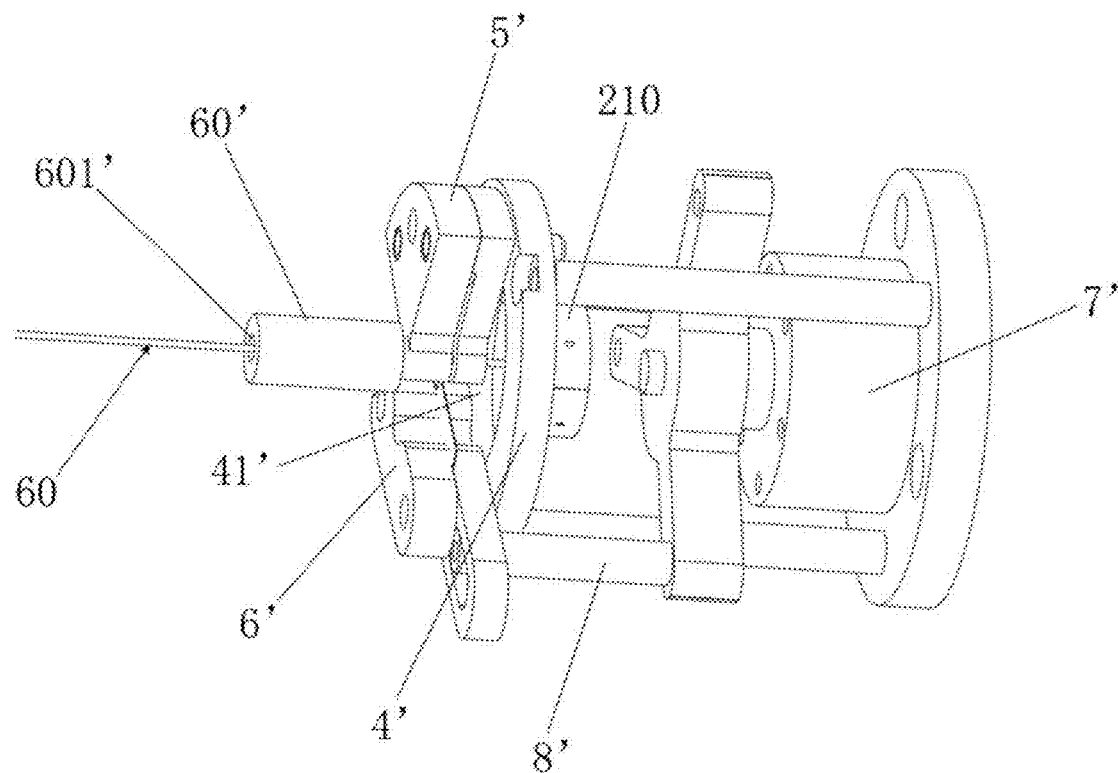
FIG. 29 is a schematic structural view of a cutting device in the fifth embodiment of the present disclosure.

In addition, it can be understood that since continuous production is adopted in this embodiment, the whole sealing and cutting device is placed horizontally. Therefore, during the horizontal conveying process of the strip material 60, the sealing and cutting accuracies may be affected by gravity. Thus, as shown in FIG. 29, in this embodiment, the cutting device 20 is further provided with a clamping portion 210 configured to clamp and fix the material 60, thereby ensuring the cutting accuracy.

Figure 30:
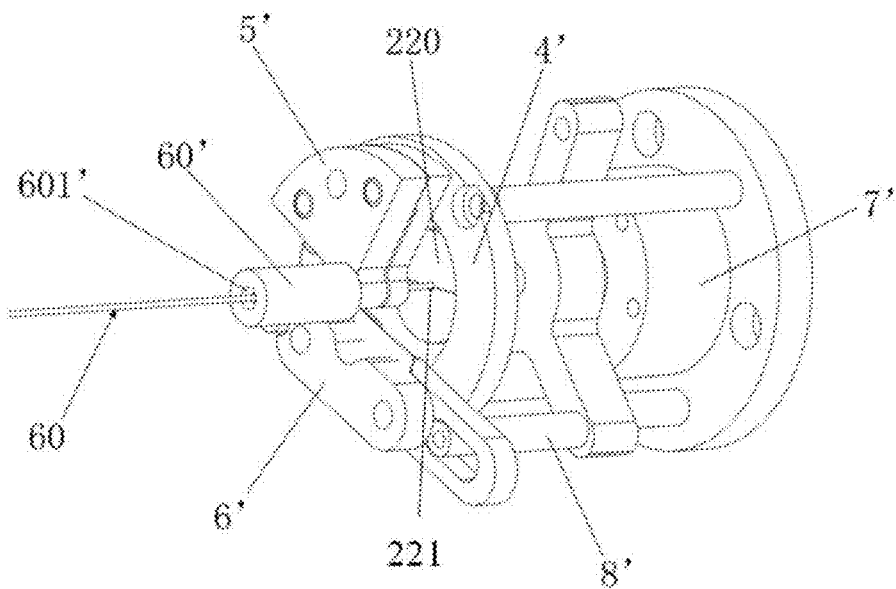
FIG. 30 is a schematic structural view of the cutting device in a clamping state in the fifth embodiment of the present disclosure.

Specifically, as shown in FIG. 30, in this embodiment, the clamping portion 210 includes multiple clamping pieces 220, and the clamping pieces 220 together form a clamping hole 221. The clamping pieces 220 are openable or closeable in a vertical plane so as to clamp or release the material 60. When the material 60 needs to be cut, the two clamping pieces 220 may clamp an end portion of the material 60 so as to limit the position of the material 60, so that the material 60 can be cut. After the cutting is complete, the two clamping pieces 220 may release the material 60, so that the particle that has been cut off falls into a collecting portion 820 there below under the action of gravity.

Alternatively, the clamping portion 210 includes one clamping piece 220, and the clamping piece 220 is provided with a clamping hole 221. The clamping portion 210 is movable along the horizontal direction. When the material 60 needs to be cut, the clamping portion 210 moves close to the material 60, and an end portion of the material 60 is extended into the clamping hole 221 so as to be fixed, thereby limiting the position of the material 60. After the cutting is completed, the clamping portion 210 moves away from the material 60, so that the particle that has been cut off leaves the clamping hole 221 and falls into the collecting portion 820 therebelow under the action of gravity.

In addition, it can be understood that if the material 60 has a thick inner wall which has a certain hardness and structural strength, then the material 60 will be hardly affected by gravity. In this case, the clamping portion 210 may be removed, and the material 60 may be directly heat-sealed and cut. The user may make choices adaptively according to actual production needs, which is not specifically limited here.

As shown in FIG. 28, the collecting portion 820 is located below the cutting device 20 and configured to collect single particles formed after cutting, so that the particles fall onto a conveyor belt 910 below the collecting portion 820 one by one. Specifically, in this embodiment, the collecting portion 820 is funnel-shaped. The collecting portion has a bigger opening at the top, which facilitates the collection of the particles, and a smaller opening at the bottom (only slightly bigger than the single particle), which allows the single particles to pass through and fall on the conveyor belt 910 through the opening at the bottom. Therefore, the conveyor belt 910 can convey the single particles one by one to a subsequent process, for example, a packaging process, etc.

The sealing and cutting device in this embodiment of the present disclosure is a portable apparatus, which is suitable to be placed on a table such as an office table or an operating table so as to be operated by medical staff. Therefore, settings can be adjusted according to the patient's condition to produce particles with different lengths or different tube diameters. The working efficiency may be set by the control device, for example, to 2 to 10 s/particle. In a case that a material with openings is used, the particles sealed at both ends prepared by the sealing and cutting device in this embodiment of the present disclosure may be immersed in various drug liquids prepared according to the patient's condition, so that the drug liquid can be carried inside the particles on the spot to form different drug-carrying particles, which can be delivered into human bodies or animal bodies through implantation or interventional operations.

It should be noted that the sealing and cutting devices in the first embodiment to the fourth embodiment of the present disclosure are applicable to on-table production, and the sealing and cutting device in the fifth embodiment is applicable to a production line in a factory. It can be understood that different embodiments may be combined or adjusted to adapt to different application scenes.

The sealing apparatus, the sealing and cutting device and the processing method provided by the present disclosure have been described in detail above. For a person of ordinary skill in the art, any obvious changes made to the present disclosure without departing from the essential contents of the present disclosure will constitute an infringement of the patent right of the present disclosure, and the corresponding legal responsibility shall be assumed.

What is claimed is:

1. A sealing and cutting device, comprising a sealing apparatus, a cutting device and a control device, wherein
the conveyor is arranged upstream of the sealing apparatus and continuously conveys a strip material along a first direction, the first direction being parallel with an axial direction of the strip material;
the sealing apparatus is reciprocatable along a second direction to squeeze and hot-melt the strip material so as to form a heat-sealed part with a set thickness, the second direction being perpendicular to the axial direction of the strip material;
the cutting device is arranged downstream of the sealing apparatus and is reciprocatable along the second direction so as to cut the heat-sealed part;
the conveyor conveys the strip material along the first direction to the sealing apparatus for hot-melting and sealing so as to form the heat-sealed part; the conveyor continues conveying the strip material to the cutting device such that the heat-sealed part corresponds to the cutting device, thereby completing cutting of the strip material;
the control device is electrically connected to the sealing apparatus, the cutting device and the conveyor respectively so as to control mechanical movements of the devices; and the control device comprises a display screen and a plurality of buttons, and settings of the control device are changed by the plurality of buttons so as to produce particles with different specifications.

2. The sealing and cutting device according to claim 1, wherein
the sealing apparatus comprises: a sealing chassis, a squeezing portion and a sealing turntable; the sealing chassis is fixedly arranged, and a center of the sealing chassis is provided with a first central hole; a plurality of squeezing portions are provided, and the squeezing portions are movably mounted on the sealing chassis, an end of each of the squeezing portions being located in the first central hole such that the end of each of the plurality of squeezing portions located in the first central hole together forms a shrinkable hole; the sealing turntable rotatably covers the squeezing portions around an axis of the first central hole, all the squeezing portions are connected with the sealing turntable, and the sealing turntable drives the plurality of squeezing portions to move synchronously so as to continuously shrink or expand the shrinkable hole;
the cutting device comprises: a cutting chassis, a cutting portion and a cutting turntable; the cutting chassis is fixedly arranged below the sealing chassis, a center of the cutting chassis is provided with a second central hole, and a central axis of the second central hole coincides with the central axis of the first central hole; a plurality of cutting portions are provided, and the cutting portions are movably mounted on a top of the sealing chassis, and each of the cutting portions comprises a cutting edge located in the second central hole; and the cutting turntable rotatably covers the cutting portions around the axis of the second central hole, all the cutting portions are connected with the cutting turntable, and the cutting turntable drives the plurality of cutting portions to rotate together such that the cutting edges of the plurality of cutting portions squeeze each other or are separated from each other, thereby completing cutting.

3. The sealing and cutting device according to claim 2, wherein a top of the cutting chassis is provided with a cutting track around the second central hole;
each of the cutting portions comprises a cutting plate, the cutting edge, a movable column and a positioning column; the cutting edge is a column arranged on a top of the cutting plate, and a cross section of the cutting edge is fan-shaped; the movable column is arranged on the top of the cutting plate and is parallel with the cutting edge; the positioning column is arranged on a bottom of the cutting plate and located in the cutting track, and the positioning column is rotatably movable in the cutting track;

the cutting turntable is provided with second movable holes at positions corresponding to the movable columns of the cutting portions, and the movable column runs through the second movable hole and is movable in the second movable hole; and the cutting turntable is configured to drive the fixed column to move in the cutting track through the movable column, and the cutting edges of the plurality of cutting portions squeeze each other or are separated from each other as the cutting turntable rotates so as to complete cutting.

4. The sealing and cutting device according to claim 3, further comprising an adjusting device, wherein the adjusting device comprises a moving base, a limit seat and a limit member; the moving base is movably arranged on one side of the sealing apparatus, and a bottom of the limit seat is fixed on the moving base; a first end of the limit member is detachably connected to the limit seat, and a second end of the limit member is provided with at least one limit hole, an axis of the limit hole being parallel with the axis of the first central hole; and the moving base is configured to drive the limit seat to move so as to adjust the axis of the limit hole to coincide with the axis of the first central hole.

5. The sealing and cutting device according to claim 1, further comprising a positioner, wherein a distance between the positioner and the cutting edge is $D=nH+h$, wherein n is a positive integer, H is a length of a single particle after cutting the material, and h is a distance from a particle hole previously provided in the material to the nearest heat-sealed part below after the particle hole is aligned with the positioner.

6. The sealing and cutting device according to claim 1, wherein the cutting device is further provided with a clamping portion; and the clamping portion comprises a plurality of clamping pieces, the plurality of clamping pieces together forming a clamping hole, and the plurality of clamping pieces being openable or closeable in a preset plane so as to clamp or release the material.

7. A processing method using the sealing and cutting device according to claim 1, comprising the following steps:

conveying, by a conveyor, a material to be processed to a sealing apparatus along an axial direction of the material to be processed;

squeezing and sealing, by a sealing apparatus, the material to be processed along a radial direction of the material to be processed to form a heat-sealed part with a set thickness;

continuing conveying, by the conveyor, the sealed material to be processed to a cutting device such that the heat-sealed part corresponds to the cutting device; and squeezing and cutting off, by the cutting device, the heat-sealed part of the material to be processed along the radial direction of the material to be processed.

* * * * *